(12) United States Patent
Kim et al.

(10) Patent No.: US 8,986,598 B2
(45) Date of Patent: Mar. 24, 2015

(54) ALUMINA-COATED SPINEL-SILICON CARBIDE REFRACTORY COMPOSITION WITH HIGH CORROSION RESISTANCE TO COAL SLAG AND METHOD FOR MANUFACTURING THE SAME

(71) Applicant: Korea Institute of Science and Technology, Seoul (KR)

(72) Inventors: Chang Sam Kim, Seoul (KR); Sang Whan Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/674,306

(22) Filed: Nov. 12, 2012

(65) Prior Publication Data

US 2013/0260981 A1 Oct. 3, 2013

(30) Foreign Application Priority Data

Mar. 30, 2012 (KR) ........................ 10-2012-0033003

(51) Int. Cl.
*C04B 35/628* (2006.01)
*C04B 35/565* (2006.01)

(52) U.S. Cl.
CPC ......... *C04B 35/565* (2013.01); *C04B 35/62813* (2013.01); *C04B 35/62886* (2013.01); *C04B 35/62892* (2013.01); *C04B 2235/3217* (2013.01); *C04B 2235/3218* (2013.01); *C04B 2235/322* (2013.01); *C04B 2235/3222* (2013.01); *C04B 2235/5427* (2013.01); *C04B 2235/5436* (2013.01); *C04B 2235/5445* (2013.01); *C04B 2235/5454* (2013.01); *C04B 2235/5472* (2013.01); *C04B 2235/77* (2013.01); *C04B 2235/80* (2013.01)
USPC ........................... 264/621; 264/681; 264/603

(58) Field of Classification Search
CPC ................. C04B 2235/322; C04B 2235/3222; C04B 35/626; C04B 35/62625; C04B 35/62645; C04B 35/628; C04B 35/62813
USPC ......................................... 264/603, 621, 681
See application file for complete search history.

(56) References Cited

U.S. PATENT DOCUMENTS

| | | |
|---|---|---|
| 4,326,040 A | 4/1982 | Kaji et al. |
| 4,849,383 A | 7/1989 | Tanemura et al. |
| 5,318,932 A | 6/1994 | Langenohl |
| 6,815,386 B1 | 11/2004 | Kwong et al. |
| 2006/0281625 A1 | 12/2006 | Kinoshita et al. |
| 2007/0042896 A1 | 2/2007 | Peascoe-Meisner et al. |
| 2007/0213199 A1 | 9/2007 | Michael |
| 2008/0254967 A1 | 10/2008 | Buchberger et al. |
| 2009/0227441 A1 | 9/2009 | Liever et al. |

FOREIGN PATENT DOCUMENTS

| | | |
|---|---|---|
| JP | 06-100357 A | 4/1994 |
| KR | 1020110083705 A | 7/2011 |
| WO | 2010/098308 A1 | 9/2010 |

*Primary Examiner* — Joseph S Del Sole
*Assistant Examiner* — Russell Kemmerle, III
(74) *Attorney, Agent, or Firm* — Ladas & Parry LLP

(57) ABSTRACT

Disclosed is an alumina-coated spinel-silicon carbide refractory composition with good resistance to coal slag penetration and a method for manufacturing the same. The refractory composition refractory composition comprising 3 to 10 parts by weight of fine alpha alumina powder with respect to the weight of the refractory mixture, wherein the mixture is prepared by mixing alumina-coated spinel aggregates and silicon carbide in a ratio of 10:90 to 40:60 wt %, a dispersant, and an alumina sol as a binder.

12 Claims, 1 Drawing Sheet

MAGNIFICATION : 13.6X

1221 B 1400   25 wt% spinel/SiC M COMPOSITION

MAGNIFICATION : 13.6X
1221 B 1400   25 wt% spinel/SiC M COMPOSITION
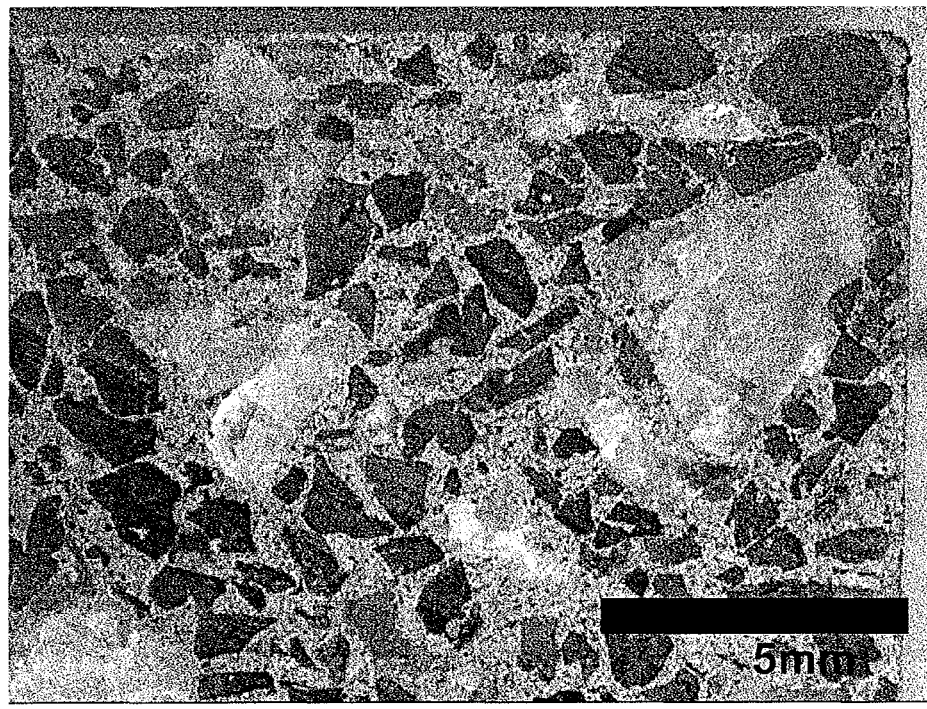

ALUMINA-COATED SPINEL-SILICON CARBIDE REFRACTORY COMPOSITION WITH HIGH CORROSION RESISTANCE TO COAL SLAG AND METHOD FOR MANUFACTURING THE SAME

CROSS-REFERENCE TO RELATED APPLICATION

This application claims under 35 U.S.C. §119(a) the benefit of Korean Patent Application No. 10-2012-0033003 filed Mar. 30, 2012, the entire contents of which are incorporated herein by reference.

BACKGROUND (a) Technical Field

The present invention relates to an alumina-coated spinel-silicon carbide refractory composition with high resistance to slag penetration and a method for manufacturing the same, which is used for a coal gasifier because of its high corrosion resistance and resistance to slag penetration.

(b) Background Art

A coal gasifier is an apparatus that enables to economically and cleanly produce useful compounds from low-grade coal. A mixture of gases obtained from the process is called synthesis gas, mostly consisting of CO and hydrogen. In a reactor, being a core of the coal gasifier, oxygen and water are added to a material containing carbon and heated at a high atmospheric pressure of about 30 to about 60. The heating temperature ranges from 1,300 to 1,600° C. depending on the melting point and the viscosity of the coal slag. Accordingly, a refractory brick used as a lining material inside the reactor requires good resistance to thermal shock, corrosion, erosion, and slag penetration. Due to the extremely strict requirements on refractories in the coal gasifier, many studies have been reported that only the refractory brick with high chromia content can meet these requirements.

The refractories having high chromia content are being used for the coal gasifier due to their high resistance to slag penetration. High-chromia refractories are very expensive, and chromia, a hazardous material under environmental regulation, may be evaporated. There is a continuing need for improved refractory, particularly with respect to slag penetration, and preferably for the development of a chromia-free refractory. U.S. Pat. No. 6,815,386 B1 relates to a refractory used for an Integrated Gasification Combined Cycle (IGCC) gasifier, in which the content of chrome oxide ($Cr_2O_3$) is equal to or greater than 60 wt %.

Examples of the chrome-free refractories include $Al_2O_3$, MgO, spinel-based ($MgAl_2O_4$), and SiC. Regarding alumina-based refractories, there are a steel-making refractory (U.S. Pat. No. 4,326,040) including alumina by 85 wt % and carbon, and a refractory (US 2009/0227441 A1) including alumina by 40 wt % to 60 wt % with fine silicon carbide powder, and using aluminum phosphate binder. Regarding MgO-based refractories, there are a refractory (US 2007/0213199 A1) including MgO by 55 wt % to 95 wt % and $ZrO_2$ by 3 wt % to 20 wt %, a refractory (U.S. Pat. No. 4,849,383) including MgO and $CaZrO_3$, and an MgO-spinel refractory (Japanese Patent Application Publication Hei 6-100347). Spinel-based refractories have in general (US 2007/0042896 A1, US 2008/0254967 A1) good resistance to high alkaline environment. As silicon carbide-based refractories that are widely used in steel making, there are silicon carbide-alumina refractory (U.S. Pat. No. 5,318,932) with alumina by 10 wt % and silicon carbide refractory (US 2006/0281625 A1) bonded by silicon nitride.

It is known that the refractories described above are lower than high chromia refractories in corrosion resistance against coal slag at a temperature of 1,500° C. or higher and under high pressure. In order to develop a chrome-free refractory for a coal gasifier, the present applicants developed a method of manufacturing a non-chrome refractory with good resistance to thermal shock, corrosion, and slag penetration by using alumina surplus spinel and silicon carbide as refractory materials, adding fine alpha alumina and alumina precursor, and performing heat treatment to form a bonding between the refractory materials and alpha alumina generated by the phase transition of alumina precursor (Korean Patent Application Publication No. 10-2011-0083705). However, in the spinel-silicon carbide refractory developed, since the surface of the silicon carbide particles was not fully protected by fine alumina powder, some fine gaps were found at the interfaces due to a reaction between spinel and SiC. Also, it was found that the fine gap causes penetration of low viscous slag at a high temperature. The present applicants made efforts to eliminate the small gaps generated at the interface between the large spinel aggregates and the silicon carbide matrix in the spinel-silicon carbide refractory. As a result, a spinel-silicon carbide refractory in which there is no noticeable gap between the aggregates and the matrix has been invented by using spinel aggregates coated with submicron-sized alumina particles.

The above information disclosed in this Background section is only for enhancement of understanding of the background of the invention and therefore it may contain information that does not form the prior art that is already known to a person of ordinary skill in the art.

SUMMARY OF THE DISCLOSURE

The present applicants made efforts to remove a fine gap generated on interface between the large spinel aggregates and the silicon carbide matrix in the spinel-silicon carbide refractory. As a result, a spinel-silicon carbide refractory in which there is no observable gap between the aggregates and the matrix has been invented by using spinel aggregates coated with fine alumina particles, which inhibits reaction between spinel and SiC to give rise to no gaps at the interface. Accordingly, the present invention provides a non-chrome based refractory composition consisted of alumina-coated spinel aggregates, silicon carbide, and alpha alumina.

The present invention also provides a method of manufacturing the refractory composition.

Other objects and advantages of the present invention will be further clarified by the detailed description of the present invention, the claims, and the accompanying drawings.

In one aspect, the present invention provides a refractory composition comprising 3 to 10 parts by weight of fine alpha alumina powder with respect to the total weight of the refractory mixture, wherein the mixture is prepared by mixing alumina-coated spinel aggregates and silicon carbide in a ratio of 10:90 to 40:60 wt %.

In the present invention, an alumina sol is used as a binder. The alumina sol binder provides operation fluidity to the refractory mixture. The content of alumina sol as a binder in the unshaped refractory may be 0.3-1.5 parts by weight as alumina relative to 100 parts by weight of the refractory mixture. If the content of the alumina sol binder is too small with respect to the refractory mixture, then the alumina sol binder cannot serve as the binder; if the content of the alumina sol binder is excessively large, problems may occur in densification and erosion resistance.

In an exemplary embodiment, the spinel may be alumina surplus spinel.

In another exemplary embodiment, the alumina-coated spinel may have a particle size of 0.5 mm to 10 mm.

In still another exemplary embodiment, the silicon carbide may have an average particle size of 0.005 to 3 mm.

In yet another exemplary embodiment, the fine alpha alumina powder may have an average particle size of 0.2 to 1.5 μm.

In still yet another exemplary embodiment, the boehmite may have an average particle size of 0.2 mm or less.

In a further exemplary embodiment, the alumina sol is employed as a binder which is synthesized by acid hydrolysis and condensation of boehmite in water.

In another aspect, the present invention provides a method of manufacturing a refractory composition, including:

coating alumina on spinel aggregates;

adding an aqueous alumina sol to the spinel aggregates for sufficient wetting;

adding a small amount of submicron sized alpha alumina and boehmite and mixing them thoroughly;

drying the resultant and heating the resultant to produce gamma alumina from the alumina gel and then sieving to remove loose alumina powder.

In an exemplary embodiment, the alumina-coated spinel may have an average particle size of 0.5 mm to 10 mm.

In another exemplary embodiment, the silicon carbide may have an average particle size of 0.003 to 5 mm.

In still another exemplary embodiment, the alpha alumina may have an average particle size of 0.2 to 1.5 μm.

In yet another exemplary embodiment, the boehmite may have an average particle size of 0.2 mm or less.

In a further exemplary embodiment, the alumina sol is employed as a binder which is synthesized by acid hydrolysis and condensation of boehmite in water Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein:

FIG. 1 is a photograph illustrating a structure of an alumina-coated spinel-silicon carbide (25 wt % spinel/SiC) refractory according to an embodiment of the present invention.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The above and other features of the invention are discussed infra.

The present invention relates to a refractory composition for a coal gasifier, which includes 10 wt % to 40 wt % of an alumina-coated spinel aggregates (average particle size ranging from 0.5 mm to 5 mm), 50 wt % to 80 wt % of the sum of silicon carbide aggregate (0.5 mm or more) and fine silicon carbide powder, and 2 wt % to 10 wt % of fine alumina powder with respect to the total weight of the refractory Hereinafter, exemplary embodiments of the present invention will be described in more detail.

The spinel may be spinel solid solution coarse particles containing surplus alumina. A spinel containing surplus magnesia may be used, but since water is used in a coal gasifier, the alumina surplus spinel has more excellent corrosion resistance than the other. Also, coarse particles of 0.5 mm to 5 mm are preferred to fine particles in terms of corrosion resistance.

The silicon carbide may be used by mixing coarse particles of 0.5 mm or more and fine particles. When particles have large sizes, the corrosion resistance becomes improved. However, when the molding density is low, the resistance to slag penetration is reduced. Accordingly, it is desirable to mix particles of different sizes in order to increase the molding density.

The fine alpha alumina is used to form a bonding between aggregates and the matrix. The average particle size of $Al_2O_3$ may be selected in a range of 0.2-1.5 μm.

An aqueous alumina sol is employed as an inorganic binder.

According to an exemplary embodiment of the present invention, a method of manufacturing a refractory composition may be provided.

The method may include:

coating alumina on spinel aggregates;

preparing a mixture by adding fine alpha alumina powder of 2 to 10 parts by weight to a mixture of alumina-coated spinel aggregates and silicon carbide with a mixed ratio of 10:90 to 40:60 wt %, in which the sum of the mixture of the alumina-coated spinel and the silicon carbide is 100 parts by weight;

adding a dispersant of 0.1~0.5 wt % relative to the mixture;

adding the alumina sol as the binder to the mixture to mold the mixture in a certain form;

removing moisture from the molded body;

sintering the molded body at 1200~1400° C. for 2 hour or more;

According to an exemplary embodiment of the present invention, the alumina-coated spinel may have a particle size of 0.5 mm to 10 mm.

According to an exemplary embodiment of the present invention, the silicon carbide may have a particle size of 0.003 to 5 mm.

According to an exemplary embodiment of the present invention, the alpha alumina may have a particle size of 0.2 to 1.5 μm.

According to an exemplary embodiment of the present invention, the amount of the alumina sol may be 0.1~1.5 wt % as alumina with respect to the refractory mixture.

Hereinafter, the present invention will be described in more detail through exemplary embodiments. These embodiments will be described to more specifically explain the present invention, and it will be apparent to those skilled in the art that the scope of the present invention is not limited to these embodiments according to essential points of the present invention.

EXAMPLES

The following examples illustrate the invention and are not intended to limit the same.

Preparation of Alumina-Coated Spinel Aggregates:

About 475 g spinel aggregate (about 3 mm to 5 mm) was washed with water and dried, and then put into a beaker. 18.5 g aqueous alumina sol (concentration of 10 wt % boehmite) was added to fully wet the aggregate, and then 4.75 g boehmite and 9.5 g alpha alumina (average particle size of about 0.5 μm) were added and mixed thoroughly. After drying, the temperature was raised to 550° C. by 3° C. per minute, and then maintained at that temperature for two hours to form gamma alumina from the alumina sol. Thereafter, the mixture was cooled by 3° C. per minute, and then was sieved to remove loose fine alumina powder and be used as alumina-coated spinel aggregates.

Preparation of 25 wt % Alumina-Coated Spinel-SiC Refractrory:

The mixture of the silicon carbide had average particle sizes of 1.25 mm, 750 μm, 90 μm, 20 μm, and 5 μm, and a mixing weight ratio of 42, 21, 10, 21, and 6, respectively. 288 g silicon carbide mixed powder, 100 g alumina-coated spinel aggregates, 12 g alpha alumina (average particle size of 0.5 μm), and 1.2 g of dispersant (VP 65, BASF Co. Ltd., Germany) were sufficiently mixed, and then 25.4 g the alumina sol (concentration of 10 wt % as boehmite) was added to be sufficiently mixed to form unshaped slurry. The unshaped slurry was molded into a size of about 10×15×120 mm. The molded sample was dried at room temperature, and then was dehydrated at an oven of about 100° C. The dried sample was heat-treated at 1,350° C. for three hours or a temperature of 1,400° C. for three hours to obtain a sintered sample. The weight loss was less than 1%. The polished surface of the sintered sample was observed using an optical microscope. The density was measured by an Archimedes method, and the 3-point bending strength was measured at a cross head speed of 1 mm/min by using the Instron instrument FIG. 1 is a photograph illustrating a polished surface of a sampled sintered at 1,400° C. There is no observable gap or crack in the interface between spinel aggregate and the matrix. The density of a sintered body at 1,350° C. was 2.64 g/cm$^3$, and the bending strength was 18 MPa. Also, the compressive strength was 84 MPa. On the other hand, the sintered body at 1,400° C. showed the density of 2.64 g/cm$^3$, the bending strength of 16 MPa, and the compressive strength of 76 MPa.

The present invention has the following features and advantages.

(i) Since a refractory composition according to an embodiment of the present invention has excellent resistance to corrosion and slag penetration, the refractory lifespan of a reactor of the coal gasifier or a blaster furnace can be extended.

(ii) Since the spinel-silicon carbide refractory does not contain chrome oxide at all, the spinel-silicon carbide refractory is an eco-friendly refractory that does not cause contamination by volatilization of chromia occurring in chromia refractories.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a spinel-SiC refractory composition, comprising:
   i) adding aqueous alumina sol to spinel aggregates to wet the spinel aggregates;
   ii) adding fine alpha-alumina and boehmite to the wetted spinel aggregates and mix thoroughly to get a spinel aggregate slurry;
   iii) drying and heating the spinel aggregate slurry to produce alumina-coated spinel aggregates;
   iv) sieving the alumina-coated spinel aggregates to remove loose alumina powder;
   v) preparing a refractory mixture by mixing together the sieved alumina-coated spinel aggregates, silicon carbide, alpha-alumina, and a dispersant;
   vi) adding the aqueous alumina sol to the refractory mixture from v) to form an unshaped slurry;
   vii) molding the unshaped slurry into a molded body; and
   viii) drying and sintering the molded body to manufacture the spinel-SiC refractory composition.

2. The method of claim 1, wherein the spinel aggregates comprises alumina surplus spinel.

3. The method of claim 1, wherein the alumina-coated spinel aggregates is prepared by adding alumina sol in the range of 0.2 to 1 parts as alumina by weight relative to the spinel.

4. The method of claim 1, wherein the boehmite comprises particles sized at 0.2 mm or less and an amount of the boehmite comprises 1 to 5 parts by weight relative to the spinel aggregates.

5. The method of claim 1, wherein the alpha alumina comprises particles sized at 0.2 to 1.5 μm and an amount of the alpha alumina comprises 1 to 5 parts by weight relative to the spinel aggregates.

6. The method of claim 1, wherein the alumina-coated spinel aggregates is prepared by drying and heating the spinel aggregate slurry at between 400° C. and 1000° C. and the alumina-coated spinel aggregates comprises particles sized at 0.5 mm to 10 mm.

7. The method of claim 1, wherein the silicon carbide comprises particles sized at 0.003 mm to 5 mm.

8. The method of claim 1, wherein the alumina sol used as the binder is synthesized by acid hydrolysis and condensation of boehmite in water.

9. The method of claim 1, wherein the aqueous alumina sol is added in the range of 0.1 to 1.5 parts as alumina by weight of the refractory mixture.

10. The method of claim 1, wherein the dispersant is selected from a group consisting of a polycarboxylate ether-based dispersant or a polyacryl-based dispersant.

11. The method of claim 1, wherein an amount of the dispersant comprises 0.1-0.5 part by weight relative to 100 parts by weight to the refractory mixture.

12. The method of claim 1, wherein the alumina-coated spinel aggregates and silicon carbide in the mixture are at a ratio of between 10:90 to 40:60 wt % and the alpha alumina powder added into the mixture is at about 2 to 10 parts by weight of the alumina-coated spinel aggregates and silicon carbide in the mixture.

* * * * *